(12) United States Patent
Smith

(10) Patent No.: US 6,523,300 B2
(45) Date of Patent: Feb. 25, 2003

(54) SLOPE GUARD

(76) Inventor: Floyd T. Smith, 27860 Elk Mt, Yorba Linda, CA (US) 92788

( * ) Notice: Subject to any disclaimer, the term of this patent is extended or adjusted under 35 U.S.C. 154(b) by 0 days.

(21) Appl. No.: 09/785,923

(22) Filed: Feb. 16, 2001

(65) Prior Publication Data

US 2002/0112398 A1 Aug. 22, 2002

(51) Int. Cl.⁷ .......................... A01G 1/00; A01G 13/00; A47G 7/08
(52) U.S. Cl. ............................. 47/32.7; 47/33; 47/32; 52/102; 52/169.4; 52/245; 256/12.5; 256/20; 256/26; 405/284; 405/15
(58) Field of Search ................ 47/33, 1.01 T, 47/1.01 F, 32.7, 32.8, 21.1, 32, 40.5, 42, 44, 45; 52/102, 169.4, 245; 256/12.5, 20, 26; 405/284, 15

(56) References Cited

U.S. PATENT DOCUMENTS

| 2,061,631 | A | * | 11/1936 | Law | |
| 2,859,558 | A | * | 11/1958 | Hallum | |
| 3,951,294 | A | * | 4/1976 | Wilson | 220/5 R |
| 4,543,745 | A | * | 10/1985 | Beck | 47/33 |
| 4,809,460 | A | * | 3/1989 | Futch et al. | 47/33 |
| 5,426,888 | A | * | 6/1995 | Gnaedig | 47/33 |
| 5,477,639 | A | * | 12/1995 | Smith | 47/58 |
| 5,566,503 | A | * | 10/1996 | Nickson | 47/33 |
| 5,615,517 | A | * | 4/1997 | Smith | 47/48.5 |
| 5,862,629 | A | * | 1/1999 | Sulyman | 47/66.1 |
| 5,884,431 | A | * | 3/1999 | Byk | 47/25 |

FOREIGN PATENT DOCUMENTS

JP   404052324 A   *  2/1992   ..........  E02D/29/02

* cited by examiner

Primary Examiner—Peter M. Poon
Assistant Examiner—Andrea Valenti

(57) ABSTRACT

A slope guard device having one or more panels formed of impervious material, interlocking along their periphery to form a rigid annular unit capable of encircling a planted area on a slope. The panels define an inner side adjacent to roots, and an outer side remote from roots, said panels of varying heights to allow a user to customize a slope profile to a slope where taller panels support the slope above the planted area. Vanes extend from the panels and project inwardly from the inner side of the panels. The vanes direct root growth. Vents are attachable to some of the vanes each having an open upper end and open lower end, said vents providing additional structural support for the slope guard. The vents guide steel stakes that can be driven into the ground.

4 Claims, 7 Drawing Sheets

SLOPE GUARD

BACKGROUND

In the past, Smith U.S. Pat. No. 5,477,639 and Smith U.S. Pat. No. 5,615,517 presented a device for watering young plants having a relatively small root system which must be watered frequently and effectively in order to prevent the routes from prematurely trying out or freezing. When young plants such as bushes and trees are planted, they are prone to dessication duty effective watering of the root system. Frequently even though the upper surface of the ground adjacent to the plant is watered, the rapid evaporation of water results in the drying out of roots. Occasionally, if an oil residue is present on the soil surface, water will be prevented from moving through the soil and conducting the root ball, causing the tree to die.

In order to retain water in the vicinity of the root system, water impermeable, root barrier envelopes have in the past been installed around the roots; however, this technique presents some drawbacks. The problem with employing these envelopes is that while the upper surface near the plant will retain water, the lower surface may receive insufficient water, narration, and nutrients, and this can adversely affect the gross characteristics of the plant. To overcome this problem, presently designed water in permeable root barrier envelopes have included water channels which are attached to the interior side of the envelope, and through which water can be channeled to the bottom of the root system.

However, these water channels may not sufficiently irrigate the central portion of the root system, and this can stunt the outward growth of the root system will result in the plant being killed over a period of time. Hence, it would be desired to provide a water retaining, barrier envelope through which water, aeration and other additives can be delivered to both the intermediate and lower areas of the plant root system.

According to Smith U.S. Pat. No. 5,477,639 and Smith U.S. Pat. No. 5,615,517 a water retaining, a Root Barrier envelope is provided, comprising an envelope member for encircling the root system of a plant, and one or more perforated route to deflect a ribs which are attached to and extended downwardly along the of the envelope. The roots deflect a ribs are open ended and perforated along their length to enable water entering the top of the tube to pass downwardly along the to flutter ribs and out through both the bottom and, and also about the through the perforations. This enables the periphery of the root system to be irrigated only as its medial area, but water will also be supplied to the bottom of the roots. Consequently, the roots will more readily grow both healthfully and downwardly, and will result in more healthy plants with less chance of dying off. If desired, fertilizer may be inserted into the defector ribs in it solid or they would form prior to or during watering separately or together with insecticides and nematocides, fungicides, etc., as required.

Unfortunately, Smith U.S. Pat. No. 5,477,639 and Smith U.S. Pat. No. 5,615,517 may be difficult to implement on certain steep slopes. The prior art lacks a suitable solution. Landscape professionals installing new plantings on steep slopes have traditionally confronted special problems. Trees must be planted with attention to aeration, soil compaction, and fertilization. FIG. 1 shows a traditional tree planting. Unfortunately, the water that is so vital for new plantings can also wash away the soft soil and fertilizer at the base of a tree. Water can also erode the bank above into the planting area and cause it to slide into the newly planted area. FIG. 2 shows eroded slope and washed away soft soil and fertilizer. The traditional root barrier allowed the envelopes to be stored in a relatively flat stack. Unfortunately, even storage as a relatively flat stack can be cumbersome on a steep slope. Building a retaining wall from brick is another option, but is very costly and difficult especially when the slope is steep and the plantings are in a remote location.

DETAILED DESCRIPTION

Figure 3:
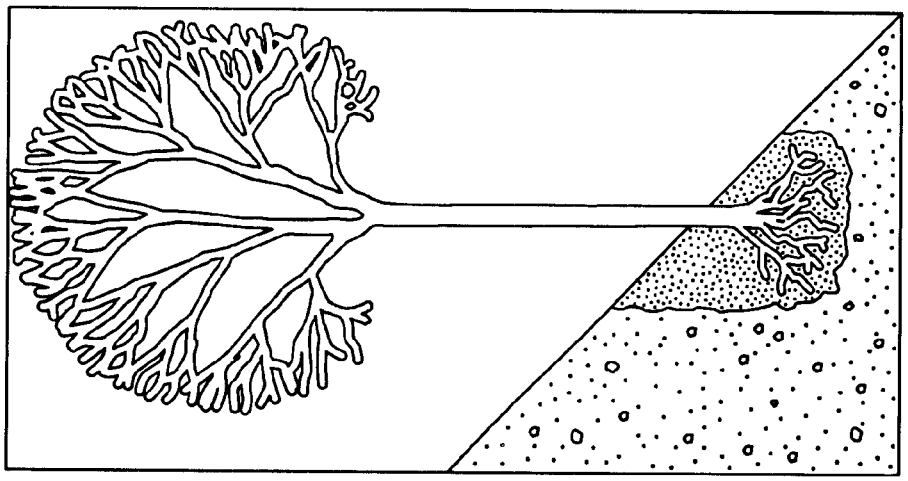
FIG. 3 shows a slope guard installed and retaining a slope
Figure 2:
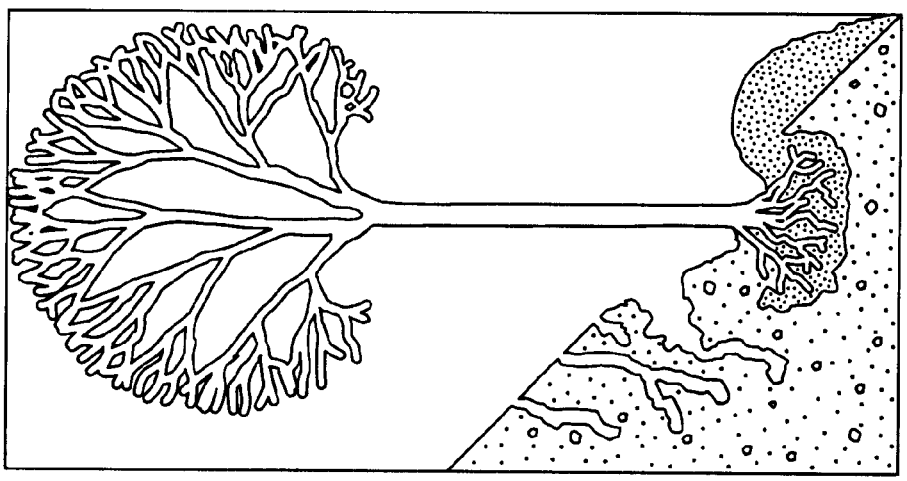
FIG. 2 shows a planting with an eroded slope and washed away soil
Figure 1:
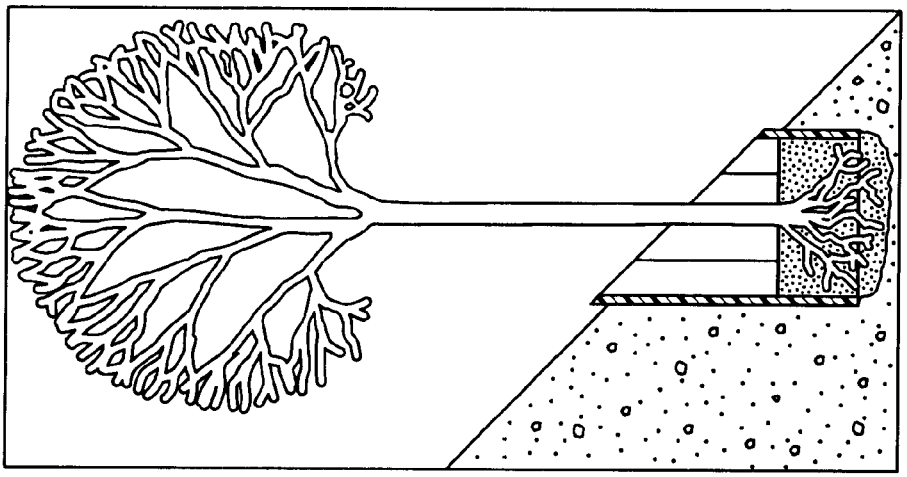
FIG. 1 shows a new planting
Figure 8:
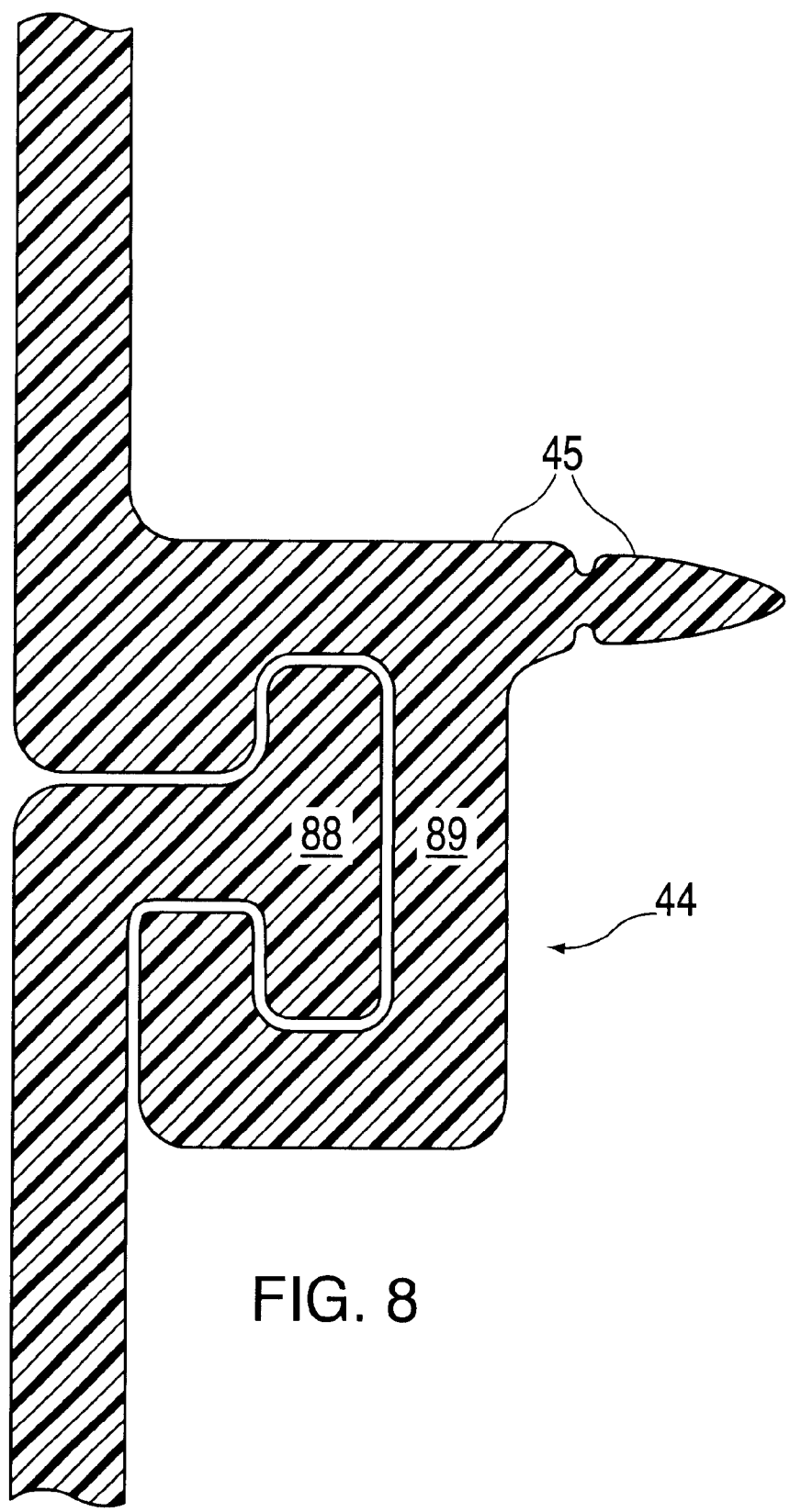
FIG. 8 shows the cross section of a ridge interconnected with a slot having a vane

The invention is a slope guard that retains the slope above the planting and holds the soil and fertilizer around the planting to allow optimal growth. FIG. 3 shows a slope guard installed. The slope guard is implemented with an interlocking modular panel system. The panels are generally flat having a preferred thickness of about one 16th of an inch. The panels are generally rectangular or trapezoidal and have a top edge and a bottom edge. They also have two side edges. Each panel FIG. 8 has a slotted edge 89 and a ridged edge 88, such that the slotted edge 89 of one panel can slide into the corresponding ridged edge 88 of the next panel. If the panel is long enough, a ridge 88 can fit into the corresponding slot 89 on the same panel.

Figure 4:
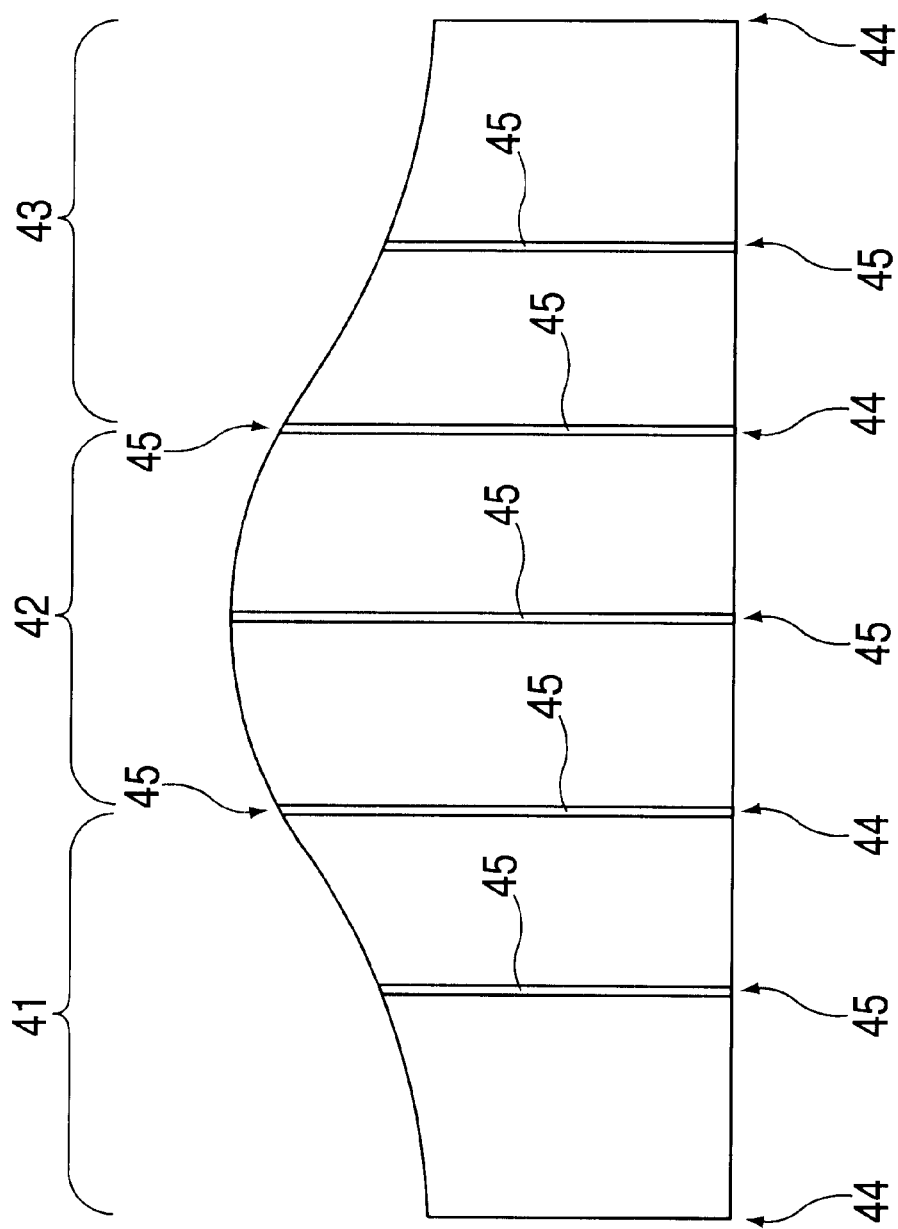
FIG. 4 shows the inner side of three panels connected together form a slope profile.

FIG. 4 shows a slope guard having three panels 41, 42, 43. The panels are interconnectable along their periphery 44 such that they can connect together circumferentially to define a unitary cylindrical envelope ring. When assembled, the unitary whole becomes rigid. Each panel has an interior surface and an exterior surface. The exterior of the panel faces outward and away from the new planting while the interior of the panel faces inward embracing the new planting.

The panels can vary in height and profile such that one can use various panels to form a slope guard profile. The taller panels 42 support the ground above the planted area. FIG. 4 shows a typical profile having a tall panel 42 interlocked with two lower panels. The profile can be varied according to the slope and characteristics of the ground. Sometimes one does not know exactly which parts may be needed until venturing onto the steep slope. By having interchangeable parts, the slope profile can be easily changed in the field to match the characteristics of the ground.

Each panel of the system has one or more root directing vanes facing inward 45. Not all panels need to have vanes 45. Some panels can have holes to encourage root growth in a particular direction. The vanes 45 are generally vertically aligned and protrude perpendicularly from the panel. The vanes 45 redirect roots away from the inner surface of the panel. As roots grow they may grow against the inside surface of a panel. Some may grow down and some may grow up. The roots that grow to the left or right are encouraged away from the periphery when they follow the root redirecting vanes 45. The vanes 45 are preferably integrally formed with the panels, but can be attached by other known means. The vanes 45 also protrude from the peripheral interlocking slotted edges FIG. 8, 44 to discourage roots from entering the space between panels.

Figure 5:
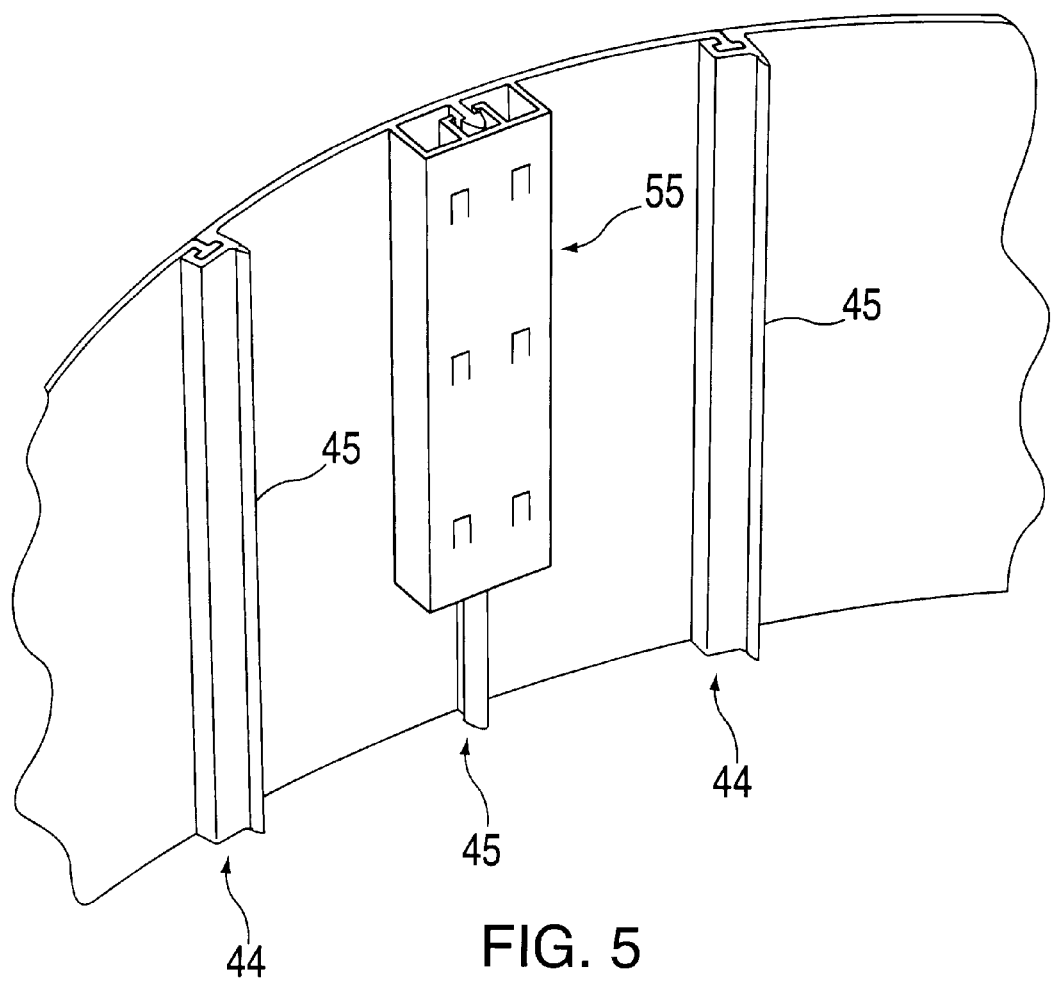
FIG. 5 shows the inside surface of a panel having vanes and a vent
Figure 6:
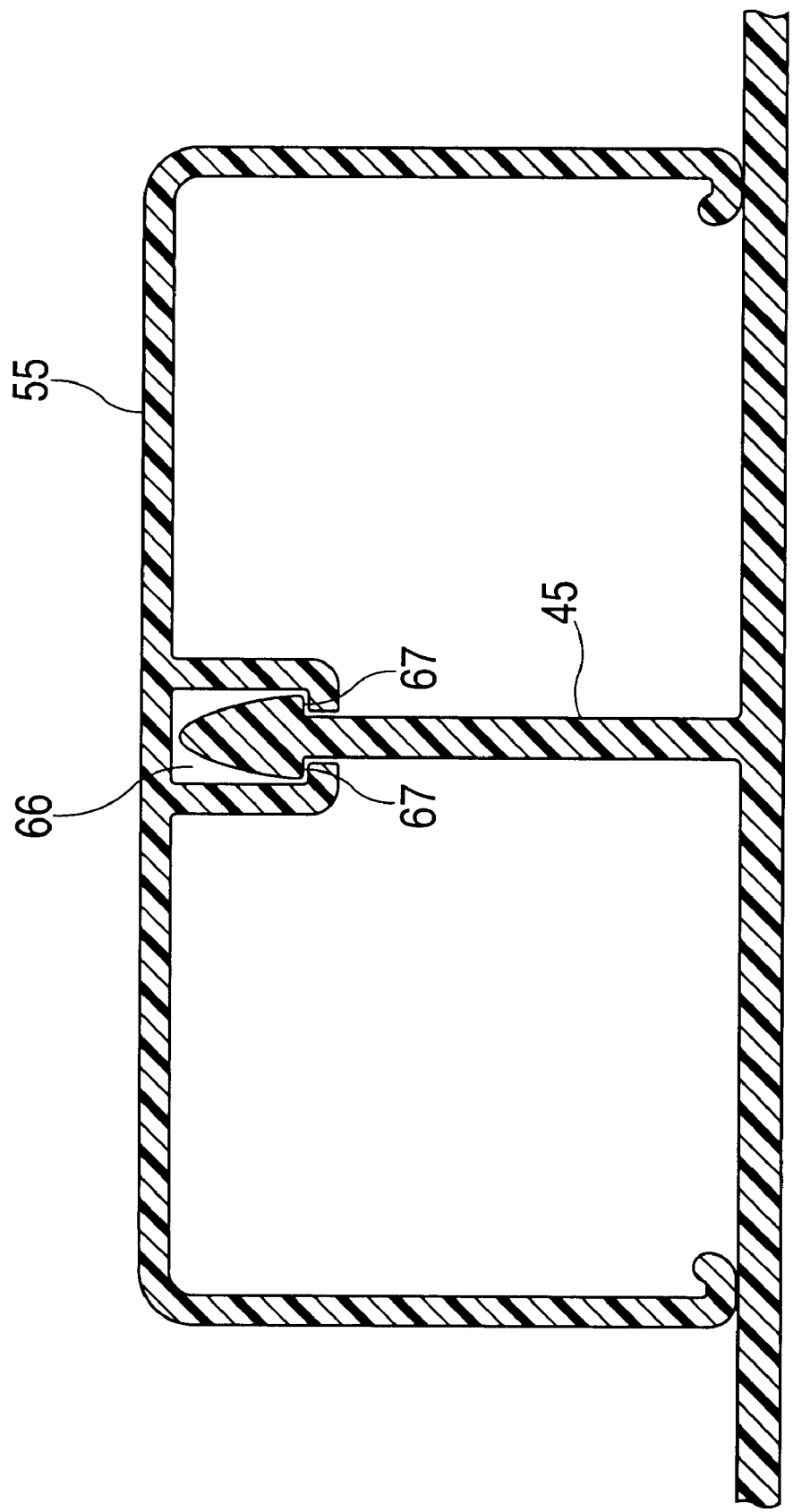
FIG. 6 shows a clip on watering vent
Figure 7:
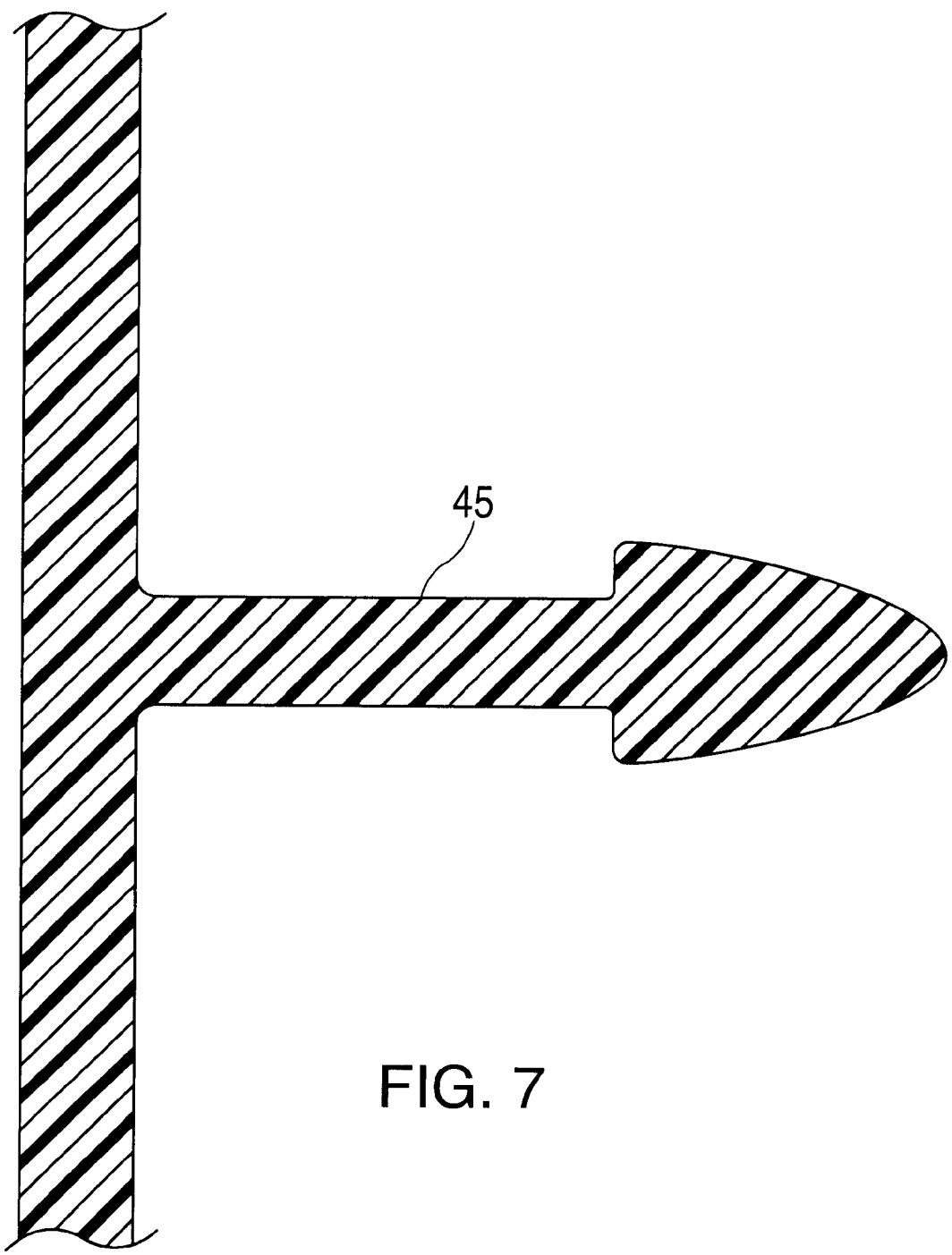
FIG. 7 shows a vane

The vanes on the slotted side or ridged side have long longitudinal notches FIG. 6, 67 formed from arrow shaped protrusions affixed to the vanes. Two longitudinal notches on either side preferably give the vane an arrow shaped cross section FIG. 7. Modular clip on watering vents FIG. 5, 55 and FIG. 6, 55 have a retaining slot FIG. 6, 66 along their length that can receive the longitudinal notches on the root directing vanes 67.

The clip on watering vents 55 guide water, air and nutrients to the roots. The vents 55 also provide rigidity and structural support for the slope guard envelope. The vents 55 form long holes that can guide a metal stake driven into the ground to provide yet additional support. Steel stakes and reinforced vents offer modular and structural support on an as needed basis in the field. The vents 55 can be affixed to the panels being integrally formed or slidably coupling into slots on the vanes 45, but the preferred method is to have vents 55 clip on the vanes 15.

Figure 9:
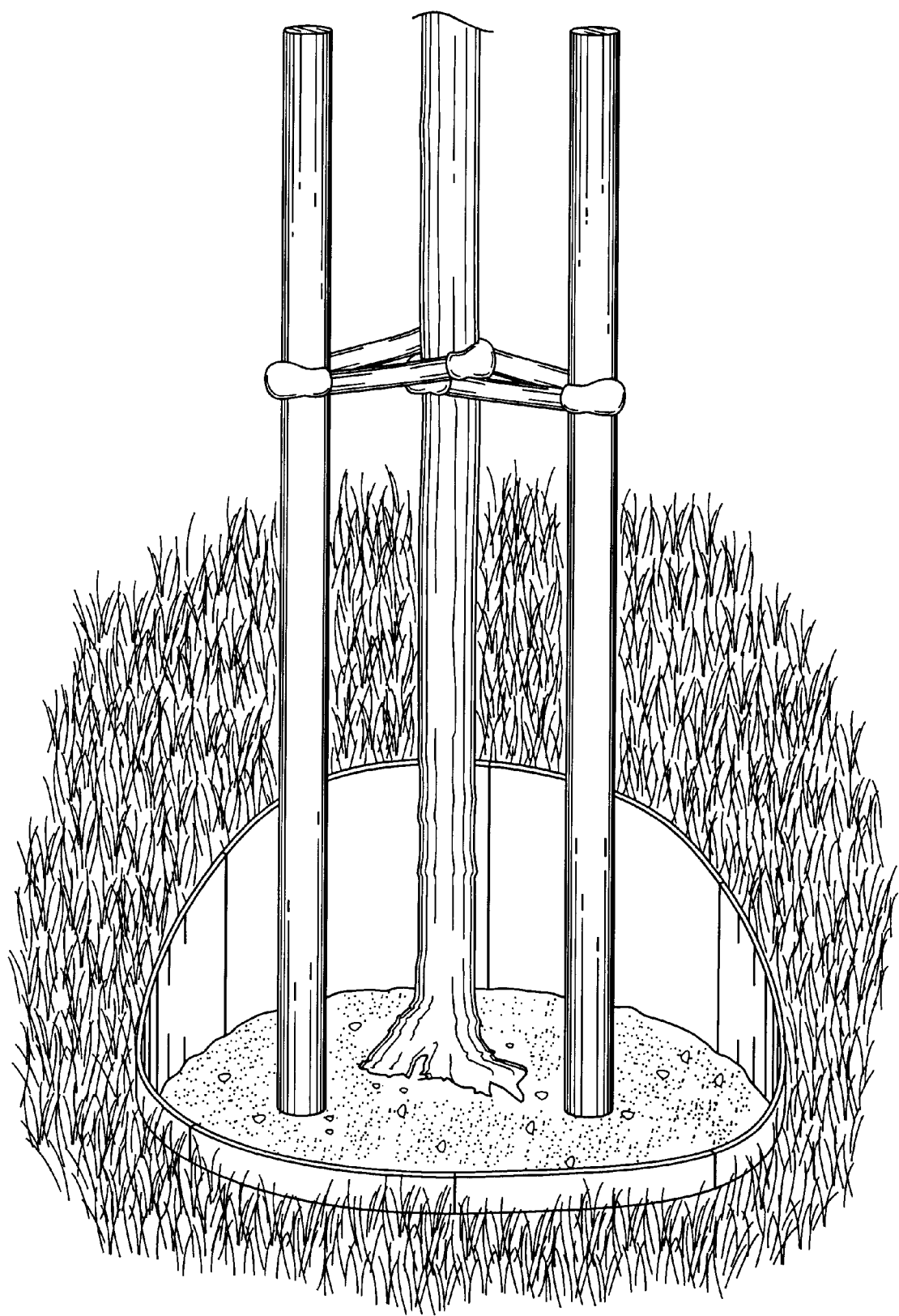
FIG. 9 shows a slope guard installed in a slope

FIG. 9 The slope guards prevent erosion by retaining the soft soil around the newly planted roots. The slope guards also direct roots downward to provide strength for new plantings.

The panels and vents may be cast, extruded, injection molded or integrally formed. Suitable materials for the panels and vents can be made of long lasting materials such as resin tiered graphite laminates, plastic molded and extruded materials such as PVC, polyethylene, polystyrene, and polypropylene.

What is claimed is:

1. A slope guard device comprising:
   a. one or more panels formed of impervious material, capable of interlocking along their periphery to form a rigid annular unit capable of encircling a planted area on a slope, said panels defining an inner side adjacent to roots, and an outer side remote from roots, said panels of varying heights to allow a user to customize a slope profile to a slope where taller panels support the slope above the planted area, wherein upper edges of panels conform to the slope being flush with the surrounding soil of the slope,
   b. one or more vanes extending from said panels, said vanes projecting inwardly from the inner side of said panels, said vanes capable of directing root growth,
   c. one or more vents attachable to some of said vanes each having an open upper end and an open lower end, said vents providing additional structural support for the slope guard, said vents capable of directing the path of a long steel stake driven into the ground if needed for additional structural support.

2. The slope guard of claim 1, wherein some of said vanes extend from either slotted areas or ridged areas.

3. The slope guard of claim 1, wherein some of said panels have a plurality of perforations through the inner and outer surfaces.

4. The slope guard of claim 1, wherein some of said vents define a plurality of perforations for delivering water applied from an open upper end of a vent downwardly through perforations.

* * * * *